United States Patent
Endsley

(10) Patent No.: US 10,284,825 B2
(45) Date of Patent: May 7, 2019

(54) SYSTEMS WITH INTEGRATED REFRACTIVE AND DIFFRACTIVE OPTICS

(71) Applicant: Rambus Inc., Sunnyvale, CA (US)

(72) Inventor: Jay Endsley, Santa Clara, CA (US)

(73) Assignee: Rambus Inc., Sunnyvale, CA (US)

( * ) Notice: Subject to any disclaimer, the term of this patent is extended or adjusted under 35 U.S.C. 154(b) by 443 days.

(21) Appl. No.: 15/244,297

(22) Filed: Aug. 23, 2016

(65) Prior Publication Data

US 2017/0070687 A1 Mar. 9, 2017

Related U.S. Application Data

(60) Provisional application No. 62/215,527, filed on Sep. 8, 2015.

(51) Int. Cl.
*H04N 9/04* (2006.01)
*H04N 5/225* (2006.01)
*G02B 13/16* (2006.01)
*G02B 5/18* (2006.01)

(52) U.S. Cl.
CPC ............ *H04N 9/045* (2013.01); *G02B 13/16* (2013.01); *H04N 5/2254* (2013.01); *H04N 5/2256* (2013.01); *G02B 5/1814* (2013.01); *G02B 5/1819* (2013.01); *G02B 5/1871* (2013.01)

(58) Field of Classification Search
CPC .... G02B 5/1814; H04N 9/045; H04N 5/2254; H04N 5/332
USPC .................................. 250/237 G, 216, 208.1
See application file for complete search history.

(56) References Cited

U.S. PATENT DOCUMENTS

| | | |
|---|---|---|
| 4,360,797 A | 11/1982 | Fenimore et al. |
| 5,113,286 A | 5/1992 | Morrison |
| 5,978,139 A | 11/1999 | Hatakoshi et al. |
| 6,242,731 B1 * | 6/2001 | Bohn ............... G01B 11/024 250/208.1 |
| 6,282,034 B1 | 8/2001 | Onishi et al. |

(Continued)

FOREIGN PATENT DOCUMENTS

WO  WO-1992-007281 A1  4/1992
WO  WO-2001-065305 A1  9/2001
(Continued)

OTHER PUBLICATIONS

Article 19 Amendment dated Sep. 3, 2014 in International Application No. PCT/US2014/019976. 9 pages.

(Continued)

*Primary Examiner* — Que Tan Le
(74) *Attorney, Agent, or Firm* — Silicon Edge Law Group LLP; Arthur J. Behiel

(57) ABSTRACT

An imaging system includes a refractive optical element and one or more diffractive optical gratings disposed over a two-dimensional array of photosensitive pixels. The different gratings present different patterns and features that are tailored to produce point-spread responses that emphasize different properties of an imaged scene. The different responses are captured by the pixels, and data captured from the responses can be used separately or together to analyze aspects of the scene. The imaging systems can include circuitry to analyze the image data, and to support modes that select between point-spread responses, selections of the pixels, and algorithms for analyzing image data.

20 Claims, 7 Drawing Sheets

(56) References Cited

U.S. PATENT DOCUMENTS

| | | |
|---|---|---|
| 6,519,389 B1 | 2/2003 | Hashimoto et al. |
| 7,067,784 B1 | 6/2006 | Lowans |
| 7,671,321 B2 | 3/2010 | Perlman et al. |
| 7,705,970 B2 | 4/2010 | Piestun et al. |
| 7,767,950 B2 | 8/2010 | Perlman et al. |
| 7,923,677 B2 | 4/2011 | Slinger |
| 8,212,914 B2 | 7/2012 | Chiu |
| 8,305,456 B1 | 11/2012 | McMahon |
| 9,110,240 B2 | 8/2015 | Gill et al. |
| 9,268,071 B2 | 2/2016 | Gill et al. |
| 9,442,228 B2 | 9/2016 | Gill et al. |
| 2002/0075990 A1 | 6/2002 | Lanza et al. |
| 2005/0046944 A1 | 3/2005 | Shenderova et al. |
| 2008/0055727 A1 | 3/2008 | Inoguchi |
| 2009/0122148 A1 | 5/2009 | Fife et al. |
| 2009/0316014 A1 | 12/2009 | Lim et al. |
| 2010/0118172 A1 | 5/2010 | McCarten et al. |
| 2011/0085051 A1 | 4/2011 | Chi et al. |
| 2011/0174998 A1 | 7/2011 | Molnar et al. |
| 2011/0248151 A1 | 10/2011 | Holcombe et al. |
| 2012/0091372 A1 | 4/2012 | Molnar et al. |
| 2012/0182618 A1 | 7/2012 | Okada et al. |
| 2012/0189293 A1 | 7/2012 | Cao et al. |
| 2012/0226480 A1 | 9/2012 | Berkner et al. |
| 2013/0032734 A1 | 2/2013 | Santori et al. |

FOREIGN PATENT DOCUMENTS

| | | |
|---|---|---|
| WO | WO-2012-007561 A2 | 1/2012 |
| WO | WO-2012-018887 A2 | 2/2012 |
| WO | WO-2012-058360 A2 | 5/2012 |

OTHER PUBLICATIONS

Bi et al., "Inverse Symmetric Dammann Gratings," Elsevier, Optics Communications, vol. 282, 2009, pp. 742-747. 6 pages.

Chang et al., "Moire Fringes by Two Spiral Gratings and Its Applications on Collimation Tests," Received May 15, 1995, Chinese Journal of Physics, vol. 33, No. 4, Aug. 1995, pp. 439-449. 11 pages.

Druart et al., "MICROCARD: A Micro-Camera Based on a Circular Diffraction Grating for MWIR and LWIR Imagery," Optical Design and Engineering III, Proc. of SPIE, vol. 7100, 2008. 8 pages.

Fife et al., "A 3MPixel Multi-Aperture Image Sensor with 0.7um Pixels in 0.11um CMOS," Stanford University, Slide Show Presentation, 2008. 56 pages.

Fife et al., "Multi-Aperture Imaging Devices," Department of Electrical Engineering, Stanford University, Slide Show Presentation, 2007. 24 pages.

Garcia-Martinez et al., "Generation of Bessel Beam Arrays Through Dammann Gratings", Mar. 20, 2012, vol. 51, No. 9, Applied Optics. pp. 1375-1381. 7 Pages.

Gill et al., "Robustness of Planar Fourier Capture Arrays to Colour Changes and Lost Pixels," The 9th International Conference on Position Sensitive Detectors, Sep. 12-16, 2011. 15 pages.

Gill et al., "Scaling Properties of Well-Tiled PFCAs," Optical Society of America, 2012. 3 pages.

Gill, Dr. Patrick R., "Tikhonov Regularization for Image Recovery from an Odd-Symmetry Grating Array," dated Mar. 4, 2014. 2 pages.

Guerineau et al., "Generation of Achromatic and Propagation-Invariant Spot Arrays by Use of Continuously Self-Imaging Gratings," Apr. 1, 2001, vol. 26, No. 7, Optics Letters. 3 pages.

Gunturk et al., "Camera Phasing in Multi-Aperture Coherent Imaging," Optical Society of America, 2012. 10 pages.

Horisaki et al., "Regularized Image Reconstruction for Continuously Self-Imaging Gratings," Jun. 1, 2013, vol. 52, No. 16, Applied Optics. 10 pages.

Mawardi et al., "ABCD-Treatment of a Propagating Doughnut Beam Generated by a Spiral Phase Plate," Optical Society of America, 2011. 6 pages.

Morrison, Rick L., "Symmetries That Simplify the Design of Spot Array Phase Gratings," Journal of the Optical Society of America A, vol. 9, Issue 3, pp. 464-471, 1992. 8 pages.

Nagahara et al., "Programmable Aperture Camera Using LCoS," Kyushu University, Columbia University, Osaka University, 2010. 14 pages.

Niv et al., "Spiral Phase Elements Obtained by Use of Discrete Space-Variant Subwavelength Gratings," Elsevier, Optics Communications, vol. 251, 2005, pp. 306-314. 9 pages.

PCT International Search Report and Written Opinion dated Jul. 4, 2014 in International Application No. PCT/US2014/019976. 13 pages.

Piponnier et al., "Relevance of Continuously Self-Imaging Gratings for Noise Robust Imagery," Sep. 1, 2012, vol. 37, No. 17, Optics Letters. 3 pages.

Wang et al., "A Light-Field Image Sensor in 180 nm CMOS," IEEE Journal of Solid-State Circuits, vol. 47, No. 1, Jan. 2012, pp. 257-271. 15 pages.

Wang et al., "An Angle-Sensitive CMOS Imager for Single-Sensor 3D Photography," 2011 IEEE International Solid-State Circuits Conference Digest of Technical Papers (ISSCC), pp. 412-414, Feb. 20-24, 2011. 3 pages.

Zhang et al., "Analysis of Multilevel Spiral Phase Plates Using a Dammann Vortex Sensing Grating," Optics Express, vol. 18, No. 25, Dec. 6, 2010. 6 pages.

Zomet et al., "Lensless Imaging with a Controllable Aperture," Computer Science Department, Columbia University, 2006. 8 pages.

Fraux, "OmniVisions's VGA wafer-level camera," 3D Packaging Magazine on 3DIC, TSV, WLP & Embedded die Technologies, Feb. 2012 Issue No. 22, pp. 26 and 27.

\* cited by examiner

SYSTEMS WITH INTEGRATED
REFRACTIVE AND DIFFRACTIVE OPTICS

BACKGROUND

Improved circuit, optical, and packaging technologies have enabled manufacturers to dramatically reduce the size, cost, and power usage of still and video cameras. These advances have been applied to traditional uses, such as for photography and surveillance, and have also been instrumental in spawning entirely new imaging markets. As these markets continue to emerge and expand, there remains a demand for improved cameras and enhanced functionality.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
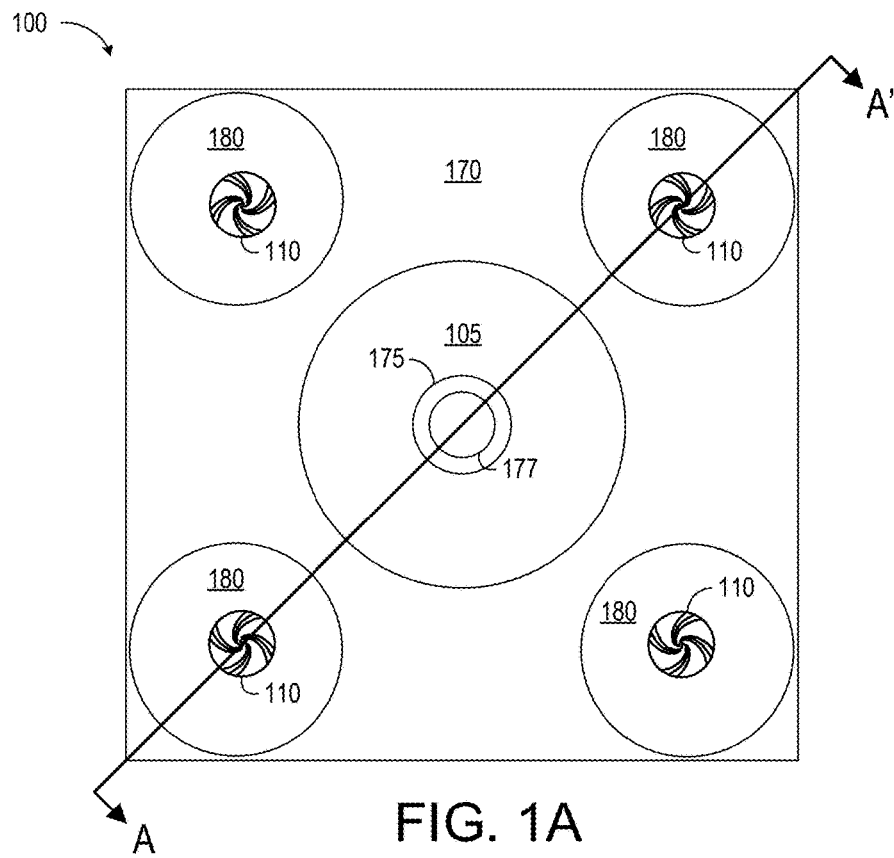
FIG. 1A depicts a hybrid imaging system 100 that combines refractive optics 105 with a collection of diffractive phase gratings 110.
Figure 1B:
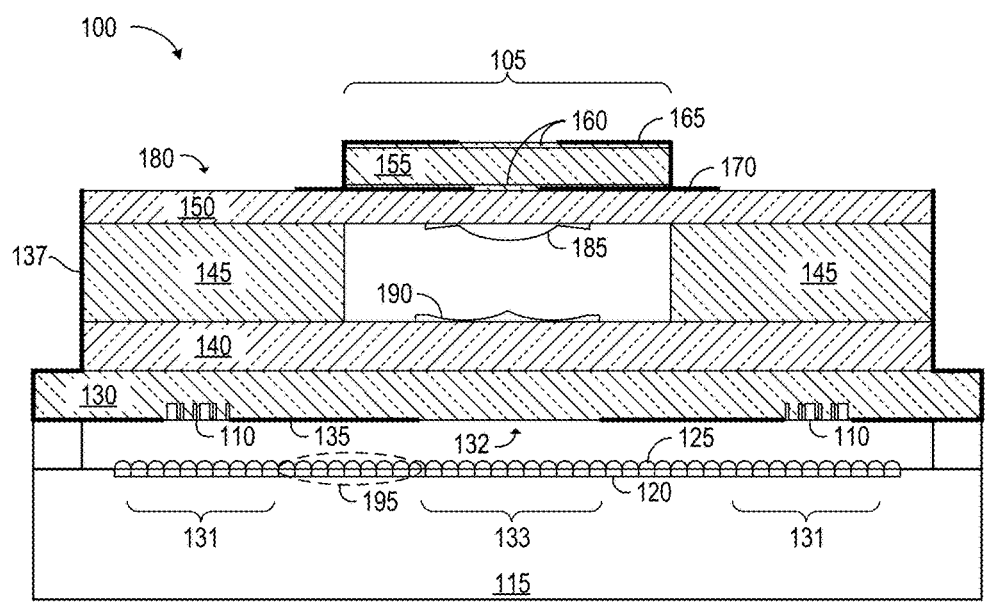
FIG. 1B is a cross section of system 100 taken along line A-A' of FIG. 1A.

FIG. 1A depicts a hybrid imaging system 100 that combines refractive optics 105 with a collection of diffractive phase gratings 110. FIG. 1B is a cross section of system 100 taken along line A-A' of FIG. 1A. In capturing images, refractive optics 105 and phase gratings 110 produce respective responses on an underlying monolithic photodetector array 115. The refractive and diffractive responses have different attributes that system 100 uses to enhance overall imaging performance. In this embodiment, refractive optics 105 capture high-resolution color images over a narrow range of incident angles; whereas phase gratings 110 capture low-resolution, black-and-white images over a wide range of incident angles. The low-resolution images can be used to sense motion, and system 100 can respond to sensed motion by e.g. pointing refractive optics 105 at the sensed motion to capture high-resolution image data. This functionality is somewhat analogous to that of the human eye, in which the retina provides color sensitivity and superior resolution near the center and increased light and motion sensitivity in the periphery.

With reference to FIG. 1B, system 100 is supported by e.g. a CMOS or CCD photodetector array 115 in which the imaging areas are provided with pixels 120, and the pixels with microlenses 125. Gratings 110 are etched into an area of the bottom of a glass carrier wafer to form a phase-grating layer 130. Each grating 110 produces a diffractive response over an array area 131 of photodetector array 115. A null area 132 of layer 130 is disposed over a second array area 133 and lacks a grating pattern. An opaque aperture layer 135 of e.g. metal limits cross coupling of responses from the different diffractive and refractive optics. An opaque coating 137 prevents light from entering via the sides.

Refractive optics 105 is formed using a stack of glass layers 140, 145, 150, and 155. From the top, glass layer 155 is disposed between a pair if infrared (IR) filters 160, and a pair of aperture layers 165 and 170 that form apertures 175, 177, and 180 (FIG. 1A). An opening in glass layer 145 contains a pair of opposing lenses 185 and 190 that cast a focused refractive response onto the central area of photodetector array 115. System 100 can include e.g. a pinhole and/or focusing optics in other embodiments.

Phase gratings 110 are framed by an aperture in layer 135. A second aperture 180 above each phase grating 110 limits the field of view, in part to block light reflected of the sides of the portion of optics 105 that protrudes from system 100. Light incident aperture 180 traverses the glass layers to impinge on grating 110, which casts a diffractive response— an interference pattern—onto the underlying area of photodetector array 115. The refractive response from optics 105 and diffractive responses from gratings 110 are separated by regions 195 of array 115 that are wide enough to prevent the responses on peripheral array areas 131 and 133 from overlapping. Null area 132 of grating layer 130 is flat and smooth on the side facing photodetector array 115, and can be or include a hole through grating layer 130 in other embodiments.

The depictions of FIGS. 1A and 1B are not to scale. In one embodiment, the region of array 115 used to capture images from optics 105 is 1,920×1080 pixels of a pitch in the range of from one to two microns; the regions of array 115 used to capture images from optics 110 are 200×200 pixels; and regions 195 provide a minimum spacing of about fifty pixels between the various responses. Other embodiments can have more or different combinations of light-barrier layers to allow closer spacing of the optical elements. In still other embodiments the "dark" areas (e.g. regions 195) can include circuitry that supports image capture indirectly, such as for addressing, processing, and storing image data.

Figure 1C:
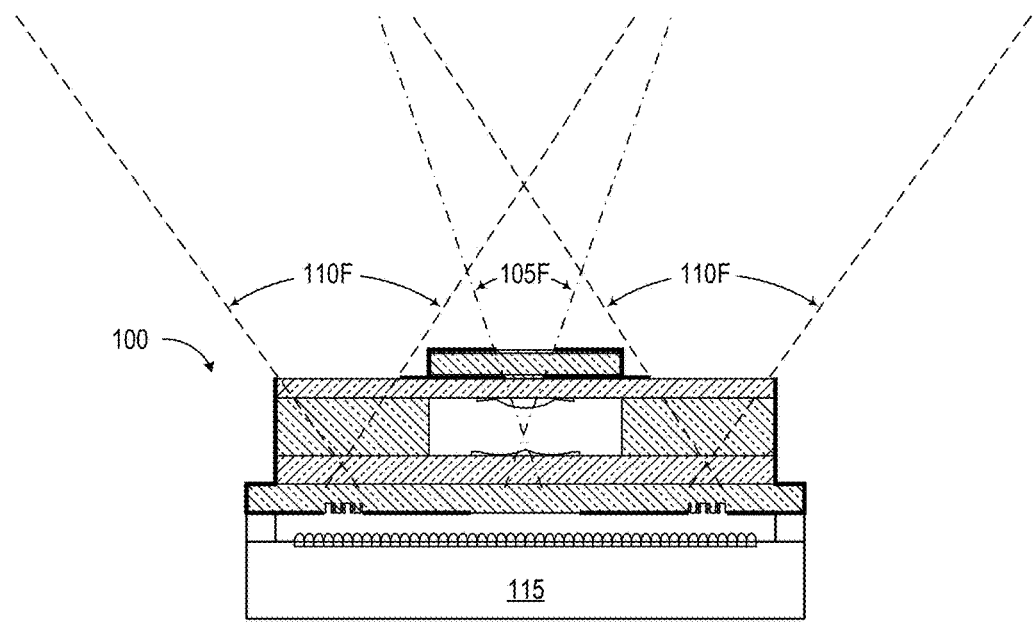
FIG. 1C depicts the cross section of system 100 from FIG. 1B with dashed lines illustrating the different ranges of angles over which the central and peripheral optics are effective.

FIG. 1C depicts the cross section of system 100 from FIG. 1B with dashed lines illustrating the different ranges of angles over which the central and peripheral optics are effective. The central, refractive optics 105 have a relatively narrow field of view 105F and the peripheral, diffractive optics 110 have relatively broad fields of view 110F. The central optics limit the fields of the peripheral optics in this example, so fields of view 110F overlap but are not coextensive. In other embodiments these overlaps can be more or less extensive. Separate or nearly separate regions can be advantageous when, for example, a portion of an imaged scene is too bright to image; data from the sensor region associated with that area can be ignored or processed differently from the other regions. Peripheral optics 110 with different fields of view can also be used to aid in motion sensing and tracking, such as to direct the camera's central field of view toward the peripheral region of sensed motion.

In other embodiments the fields of view 110F can overlap extensively to image the same scene. The image data collected from the different diffractive optics can be combined to e.g. increase the signal-to-noise ratio of the data, or different optics and/or their respective underlying regions of array 115 can sense different aspects of a scene. For example, one grating 110 can be optimized to discriminate point sources and another to sense motion; the light from different optics 110 can be filtered to discriminate different colors and/or polarizations; and different illumination regions can be treated to different apertures, exposure intervals, etc. Many combinations of optical and image processing functions can be applied to advantage.

Other embodiment can include more, and possibly many more, similar or identical gratings. In general, m duplicates of some optimized grating can be used. If the noise for such systems is approximately independent between gratings, then a simple averaging of the sensor estimates of the respective point-spread responses should lead to an improved overall estimate with variance decreased by a factor of one divided by the square root of m. If there is an estimate of the variance in each grating, then Bayesian integration of estimates will give results that are superior (less bias, less variance) to simple averaging.

The orientation and placement of gratings over a photodetector array can be relevant. For instance, depth estimation based on visual disparity might use two special-purpose gratings placed at opposite corners of the rectangular photodetector array (to form the longest inter-grating baseline). As such, the overall placement of gratings should be optimized for the expected functional uses. If there are photodetector hardware constraints, for instance, that sensor read-rate constraints can be met only if two component gratings are on the same, or on different sensor rows, such constraints should be incorporated into the grating layout optimization procedure.

Figure 2:
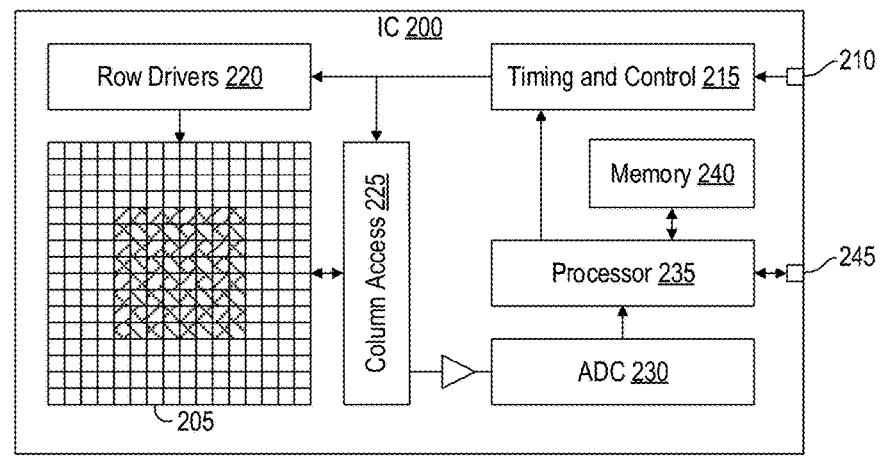
FIG. 2 schematically depicts an embodiment of a monolithic integrated-circuit device (IC) 200 that can be used for e.g. array 115 of FIGS. 1A-1C.

FIG. 2 schematically depicts an embodiment of a monolithic integrated-circuit device (IC) 200 that can be used for e.g. array 115 of FIGS. 1A-1C. IC 200 includes an array of pixels 205 with a central portion that includes a sub-array of pixels each provided with a color-specific filter (red, green, and blue), and a peripheral portion without such filters. The absence of filters renders the peripheral pixels more sensitive to light. The IR filters of FIG. 1A do not extend over the peripheral pixels, so the motion sensitivity provided by the peripheral pixels extends into longer wavelengths than can be imaged by the color optics in this example.

Pads 210 provide external control information to timing and control circuitry 215, which controls row drivers 220 and column access circuitry 225 to direct pixels 205 to convey analog image data to an analog-to-digital converter (ADC) 230. A processor 235 with access to integrated memory 240 processes the digital data from ADC 230 to produce image data on pads 245. The image data can represent the raw intensities captured by pixels 205, or can separate or separately process the image data from the various optical elements. For example, processor 235 might issue signals indicative of motion and direction to control an external servo that trains system 100 on a sensed movement, and thereafter capture and convey a high-resolution color image of the object responsible for that movement. IC 200 is a monolithic device, so the hybrid functionality does not increase the requisite number of pads.

Figure 3:
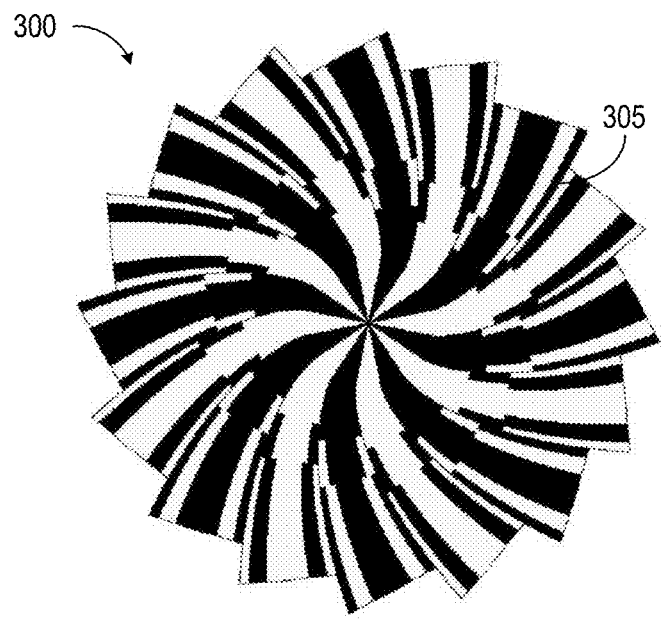
FIG. 3 is a plan view of a phase grating 300 suitable for use as gratings 110 of FIGS. 1A-1C.
Figure 4:
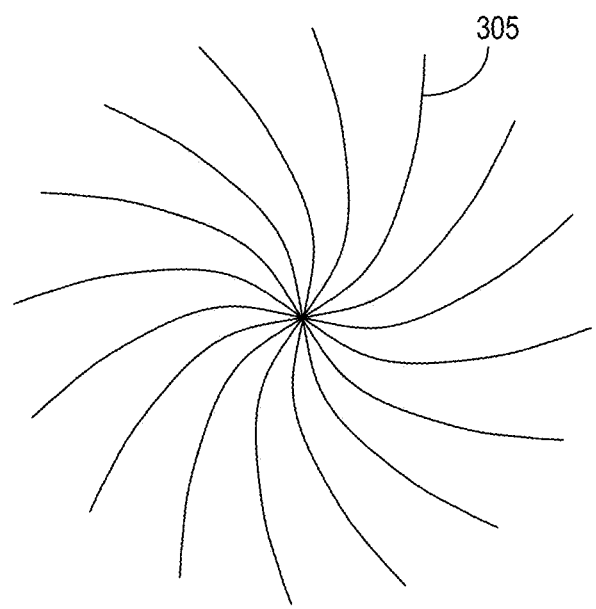
FIG. 4 depicts boundaries 305 of FIG. 3A.

FIG. 3 is a plan view of a phase grating 300 suitable for use as gratings 110 of FIGS. 1A-1C. Dark and light regions represent adjacent elevated and recessed arms that produce curved lines of odd symmetry to induce desired responses. Relatively narrow segment spacing works better for relatively high frequencies of incident light, and wider segment spacing works better for lower frequencies of light. Feature spacing increases along odd-symmetry boundaries (between elevated and recessed grating regions, represented by dark and light) with distance from the center of the spiral. Curved boundaries of odd symmetry extend radially from the center of the grating to the periphery, radiating out between the elevated and recessed arms near the center. The curved boundaries are obscured by grating features in FIG. 3, so the shapes of boundaries 305 are depicted in FIG. 4 for ease of review.

The segment widths do not continue to increase with radius, as there is a maximum desired width for a given wavelength band of interest (e.g., the widest may correspond to the lowest frequency of visible red light). The total width of one period of phase antisymmetric features optimized for red light may be the same as the width of one period of a more complicated phase antisymmetric pattern optimized for blue light. It is possible to shift from the former to the latter at certain circles of fixed radius from the center of the design whose circumference corresponds not only to integer multiple of the simple red-optimized designs but also the same integer multiple of the more complicated blue-optimized designs. The features that define the radiating boundaries therefore exhibit discontinuities as they extend from the center toward the periphery of grating 300.

Returning to the example of FIGS. 1A and 1B, system 100 uses refractive optics 105 in support of high-resolution, color imaging; and gratings 110 in support of relatively low-resolution, low-power motion sensing. Gratings suitable for use in system 100 are detailed in U.S. patent application Ser. No. 14/677,878 to Stork et al, which is incorporated herein by this reference.

Figure 5:
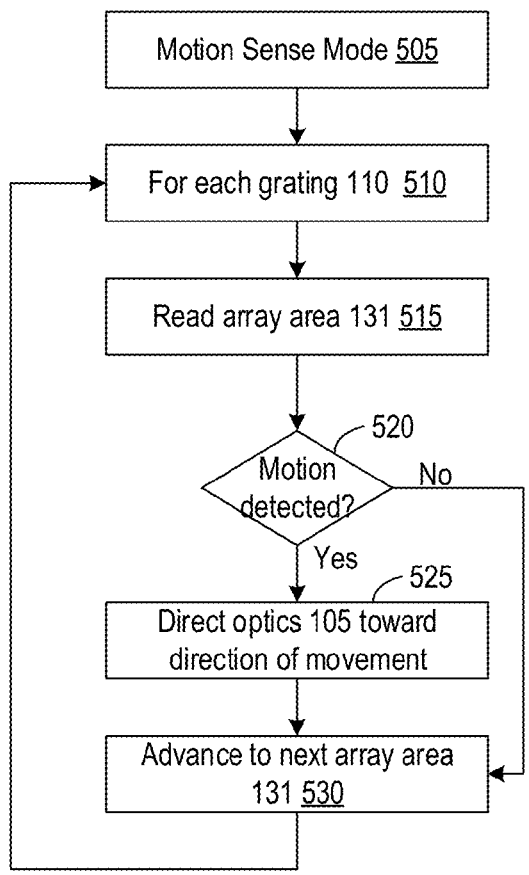
FIG. 5 is a flowchart 500 illustrating a method of detecting apparent motion and capturing high-resolution images of regions of detected motion.

FIG. 5 is a flowchart 500 illustrating a method of detecting apparent motion and capturing high-resolution images of regions of detected motion. With reference to system 100 of FIGS. 1A and 1B, motion is detected using the responses from four gratings 110, captured using respective peripheral array areas 131. High-resolution images are captured using refractive optics 105 and the underlying central array area 133.

Processor 235 (FIG. 2) automatically enters a motion-sensing mode on power up (505). Once in this mode, system processor 235 directs timing-and-control circuitry 215 (FIG. 2) to repeatedly execute a for-loop 510 that sequentially scans peripheral array areas 131 to detect image changes. For each grating 110, system 100 samples the diffractive response on the underlying array area 131 to acquire one or more frames of diffractive-response data (515). Successive frames from each array area 131 are compared to identify differences.

For any successive pair of frames, per a decision 520, if some or a combination of corresponding pixel values exhibit intensity changes $\Delta\theta$ that exceed a threshold T1, then processor 235 directs optics 105 toward the direction of detected movement (525) to sample one or more frame of refractive-response data. System 100 can remain fixated in that direction, capturing data, for a set period or number of frames. Absent detected motion, processor 235 advances system 100 to the next array area 131 (530) and the process returns to the beginning of for loop 510 to sample the next diffractive response.

System 100 is illustrative of various gratings, refractive optics, and operational modes. Other embodiments can support more, fewer, and different optics and modes. For example, an image-change detector can support modes that employ different thresholds, framerates, integration periods, sweep rate, grating selections, etc. System 100 can incorporate lighting sources to enhance image captures, such as IR lighting to aid in motion detection and a white-light flash for color image capture.

The foregoing imaging system including gratings that offer considerable insensitivity to the wavelength of incident light in a wavelength band of interest, and also to the manufactured distance between the gratings and underlying photodetector arrays. The following discussion details embodiments of such gratings.

Figure 6A:
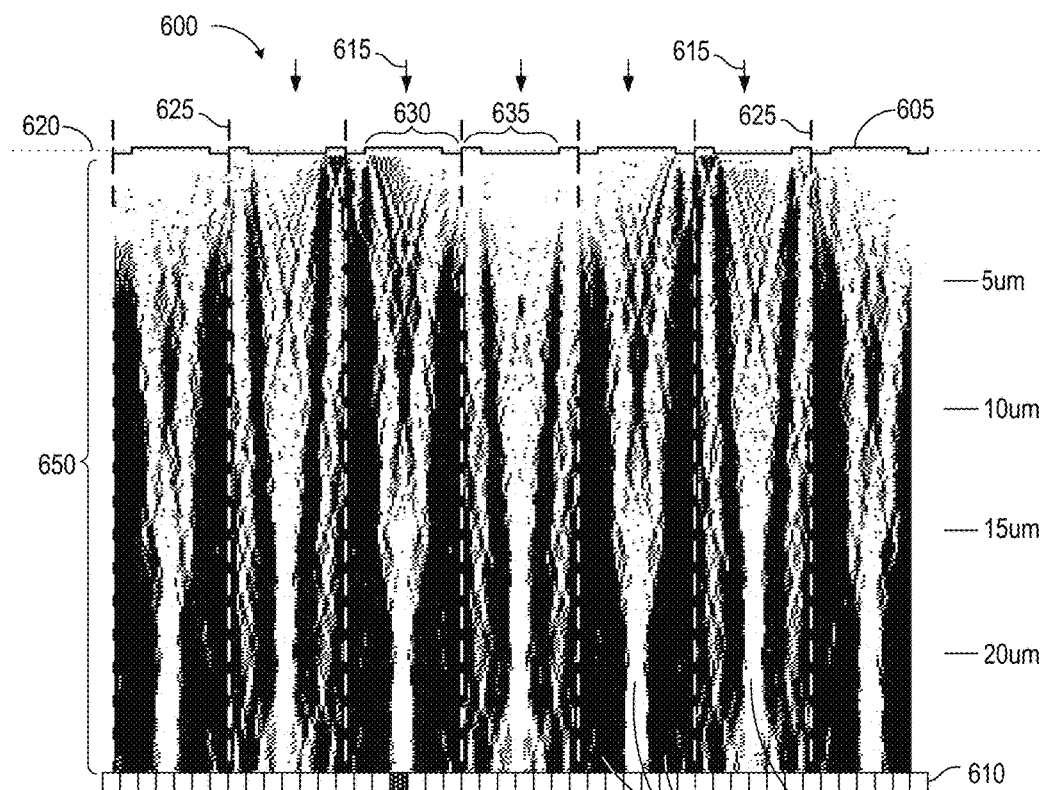
FIG. 6A is a cut-away view of an imaging device 600 that supports computational diffractive imaging.

FIG. 6A is a cut-away view of an imaging device 600 that supports computational diffractive imaging. Device 600 includes a phase antisymmetric grating 605 overlying a photodetector array 610, such as a CCD (charge-coupled device), CMOS (complementary metal-oxide-semiconductor) or (in the case of thermal IR detection) a microbolometer sensor. The photodetector array may comprise a lenslet array designed to concentrate incident photons onto the most sensitive areas of the array to increase quantum efficiency. The features of grating 605 offer considerable insensitivity to the wavelength of incident light in a wavelength band of interest, and also to the manufactured distance between grating 605 and photodetector array 610. Grating 605 produces an interference pattern for capture by array 610. Digital photographs and other image information can then be extracted from the pattern.

Imaging device 600 does not require a lens, and so can be extremely small and inexpensive. Captured interference patterns are unintelligible to a human observer, but the captured data includes sufficient information to allow the image or aspects of the image to be computed. As detailed below, computational diffractive imagers of this type can be tailored to extract application-specific information or compute decisions (rather than compute an image) based on the optical signal. Both the phase grating and the computational functions can be optimized for the information in the visual field and the task at hand.

In FIG. 6A, light in a wavelength band of interest is depicted as striking grating 605 from a direction 615 that is normal to a transverse plane 620 of the grating 605. The wavelength band of interest can be the visible spectrum. Cameras developed for use in different applications can have different bands of interest.

Dashed lines 625 highlight periodic boundaries between regions of phase antisymmetry. Each of these boundaries is a result of features 630 and 635 of odd symmetry, and produces a normally arranged curtain 640 of minimum intensity created by destructive phase interference between adjacent features 630 and 635. Curtains 640 are separated by foci 645 (curtains of maximum light intensity), and the collection of curtains 640 and foci 645 extend from grating 605 through the body 650 of device 600 to produce an interference pattern on photodetector array 610. In this illustration, the pattern of intensity variations evident in the foci and curtains are near-field spatial modulations that result from near-field diffraction. One photosensitive element 655 within array 610 is shaded beneath a focus 645 to serve as a reference for a subsequent discussion of the sensitivity of device 600 to the angle of incident light.

The image of FIG. 6A resulted from a simulation of an imaging device with the following parameters and assuming specific parameters. Body 650 is of fused silica, and is in contact with a conventional photodetector array 610 with photosensitive elements spaced by 2.2 µm. The top of grating 605 is an air interface in this example. The relatively small segments of features 630 and 635 are about 1 µm, and the relatively larger segments are about 4 µm. These segments generally form transverse plane 620, which is separated from array 610 by about 25 µm. Curtains 640 and foci 645 are the destructive and constructive interference patterns for 532 nm incident light.

The thickness of body 650 and lengths of the segments of features 630 and 635 were optimized for 400 nm light despite the selection of 532 nm light for the simulation. As a consequence, the tightest focus occurs about 5 µm above array 610 (at the 20 µm mark), or about a depth of about forty times the wavelength of incident light used for the simulation. The resultant curtains 640 plainly separate foci 645 well above and below the 20 µm mark, however, illustrating a robust insensitivity to wavelength within the band of interest. Curtains 640 are easily distinguished at depths beyond about 10 µm in this example, or about twenty times the wavelength of incident light used in the simulation. The relatively deep and continuous penetration of curtains 640 also provides considerable manufacturing tolerance for the thickness of body 650. These advantages obtain because the near-field spatial modulations projected onto array 610 are substantially wavelength independent over the wavelength band of interest, which means that the adjacent modulations (dark and light) do not reverse signs with changes in wavelength within the band of interest.

Figure 6B:
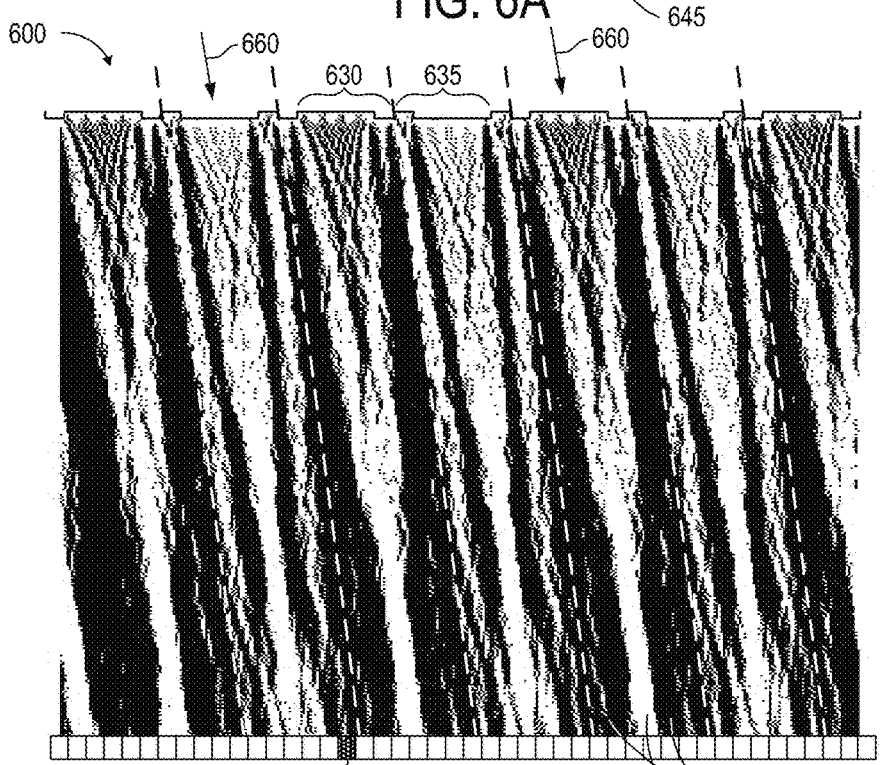
FIG. 6B depicts sensor 600 of FIG. 6A simulating light incident plane 620 at an acute angle 660 to illustrate the sensitivity of curtains 640 and foci 645 to the angle of incidence.

FIG. 6B depicts sensor 600 of FIG. 6A simulating light incident plane 620 at an acute angle 660 to illustrate the sensitivity of curtains 640 and foci 645 to the angle of incidence. Using element 655 as a reference point, we see that that the foci 645 that illuminated element 655 in FIG. 6A have considerably moved to the right in FIG. 6B. Curtains 640 and foci 645 extend at an acute angle that relates to angle 660 according to Snell's law. The separation of foci 645 by curtains 640 is maintained. Sensor 600 is thus sensitive to the angle of incidence.

Each phase antisymmetric structure generates a PSR, and the resultant collection of patterns is itself a PSR. As used herein, a "diffraction-pattern generator" is a structure that produces PSRs for light within the wavelength band of interest, and for a range of orientations of interest. In this one-dimensional example, the orientation of interest is perpendicular to the boundaries of odd symmetry.

Figure 7:
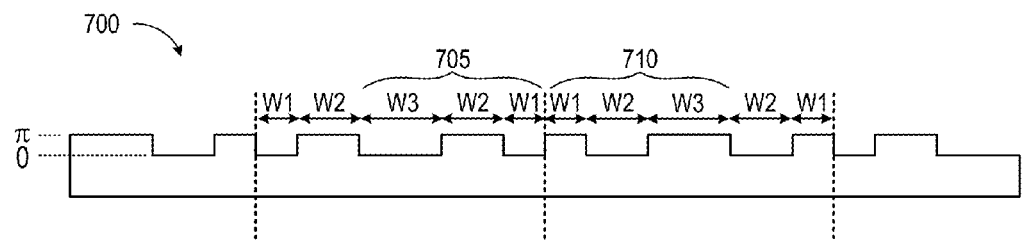
FIG. 7 depicts a one-dimensional, binary phase antisymmetric grating 700 in accordance with one embodiment.

FIG. 7 depicts a one-dimensional, binary phase antisymmetric grating 700 in accordance with one embodiment. The upper features of grating 700 are at a height $\lambda/(2(n-1))$, sufficient to induce one-half wavelength of retardation in the band of interest relative to lower features, or $\pi$ radians of relative phase delay. Features 705 and 710 on either side of each boundary exhibit odd symmetry with three differently sized segments, from narrowest to widest W1, W2, and W3. With this arrangement, paired segments (e.g., adjacent segments of width W1 within adjacent features 705 and 710) induce respective phase delays that differ by approximately half a wavelength over the wavelength band of interest.

Figure 8:
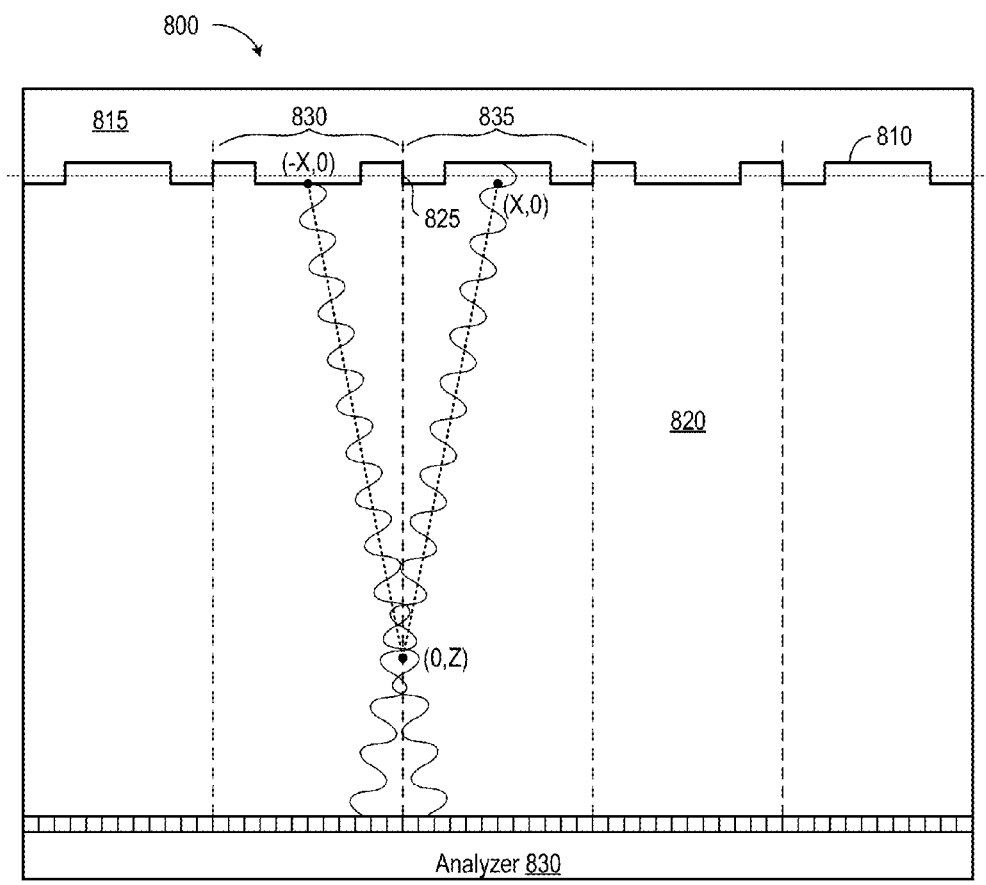
FIG. 8 depicts an imaging device 800 in accordance with an embodiment in which a binary, phase antisymmetric grating 810 is formed by an interface between light-transmissive media of different refractive indices.

FIG. 8 depicts an imaging device 800 in accordance with an embodiment in which a binary, phase antisymmetric grating 810 is formed by an interface between light-transmissive media of different refractive indices, a polycarbonate layer 815 and optical Lanthanum dense flint glass 820 in this example. Each of four boundaries of odd symmetry 825 is indicated using a vertical, dashed line. As in the foregoing examples, the upper features of grating 810 induce phase retardations of half of one wavelength (π radians) relative to lower features. Features 830 and 835 on either side of each boundary exhibit odd symmetry.

Due to dispersion, the difference in the refractive index of polycarbonate layer 815 and Lanthanum dense flint glass layer 820 is an increasing function of wavelength, facilitating a wider wavelength band of interest over which the phase delay is approximately π radians. These elements produce an interference pattern on an analyzer layer 830 (e.g., a CMOS or CCD image sensor).

This example assumes light incident the light interface of device 800 is normal to the transverse plane of phase grating 810, in which case light fields that enter grating 810 equidistant from a one of the boundaries of odd symmetry 825, such as at locations (−X,0) and (X,0), are out of phase at points beneath grating 810 (e.g., point (0,Z)), and thus destructively interfere to produce curtains of minimum intensity (e.g., curtains 640 of FIGS. 6A and 6B). Neither the depth Z nor the wavelength of light over a substantial spectrum significantly influences this destructive interference. Constructive interference similarly produces foci of maximum intensity (e.g., foci 645 of FIGS. 6A and 6B). Both the high and low features admit light, which provides relatively high quantum efficiency relative to gratings that selectively block light.

The following discussion details phase gratings in accordance with examples described in P. R. Gill and D. G. Stork, "Lensless Ultra-Miniature Imagers Using Odd-Symmetry Spiral Phase Gratings," in Imaging and Applied Optics, J. Christou and D. Miller, eds., OSA Technical Digest (online) (Optical Society of America, 2013). In that article, Gill and Stork describe a phase grating formed by a high-n, low-dispersion substrate and a low-n, high-dispersion coating that can introduce approximately λ-independent phase shifts in all normally incident visible light. Similar gratings are discussed above. If there exist certain points p on this interface that satisfy the following symmetry in their transmission t(·) and phase retardation φ(·), $$t(p+y)=t(p-y)\forall y \quad (1)$$

$$\phi(p+y)=\phi(p-y)+\pi+2n\pi\forall y,\ n\in\{0,\pm1,\pm2,\ldots\} \quad (2)$$

where y is a horizontal translation transverse to the grating direction, then the grating has phase antisymmetry about points p, and light will interfere destructively below p, regardless of λ and depth z.

A linear phase antisymmetric grating above a photosensor array could pass information from a single spatial orientation of features in the far field (transverse to the grating orientation). However, to capture information about arbitrarily oriented features of a complex scene, it is preferable to have a complete distribution of orientations in the diffractive optic. More generally, if the point-source responses (PSRs) are approximately spatially invariant, the transfer function of the imager approximates convolution with the PSR function. In such a case, the PSR should have significant power at all 2D spatial frequencies to make the inversion problem of image recovery well-conditioned.

Figure 9A:
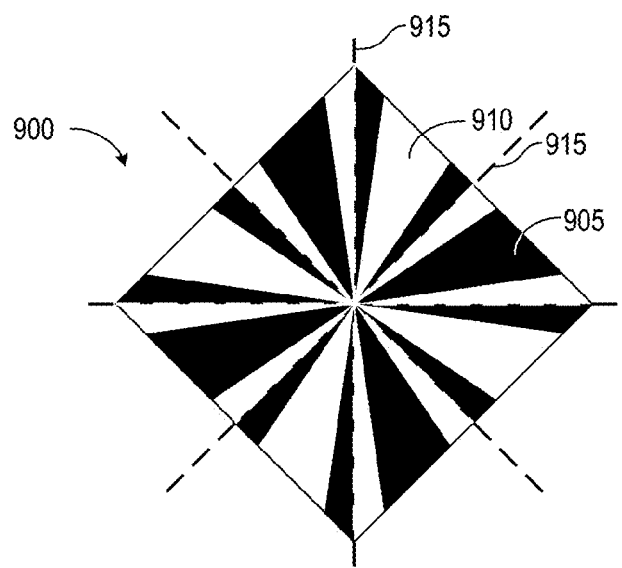
FIG. 9A is a plan view of a sensor 900 in accordance with another embodiment.

FIG. 9A is a plan view of a sensor 900 in accordance with another embodiment. Relatively high segments 905 and low segments 910 on either side of each of eight boundaries of odd symmetry 915 create a grating in which the widths of the segments increase with distance from the center of the sensor. For a given focal depth, light of higher frequencies tends to produce a sharper focus with narrower feature widths. Sensor 900 can therefore be optimized such that the central portion of the grating is optimized for collection of relatively higher frequency light, and the peripheral area for collection of relatively lower frequency light.

Figure 9B:
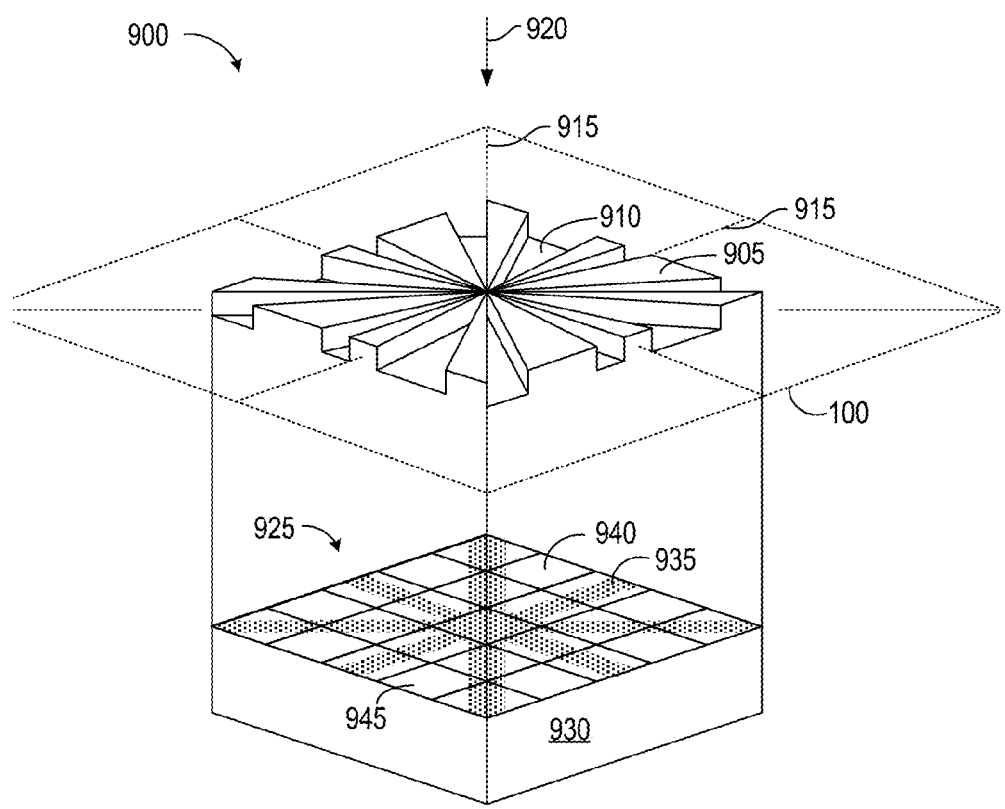
FIG. 9B is a three-dimensional perspective of sensor 900 of FIG. 9A, and shows how light 920 from a direction normal to the grating surface casts an interference pattern 925, a PSR, on an underlying photodiode array 930.

FIG. 9B is a three-dimensional perspective of sensor 900 of FIG. 9A, and shows how light 920 from a direction normal to the grating surface casts an interference pattern 925, a PSR, on an underlying photodiode array 930. Curtains and foci, as detailed previously, respectively cast shadows 935 and bright shapes 940 to be sensed by individual photosensitive elements 945 of array 930. Array 930 captures a digital representation of pattern 925.

While the subject matter has been described in connection with specific embodiments, other embodiments are also envisioned. For example; while each grating detailed previously may be used in connection with photoreceptors to collect incident light, gratings in accordance with these and other embodiments can be used more generally in imaging devices that project images from photo-emitters rather than or in addition to sensing them; sensors of the type detailed above can be used with focusing optics (e.g., lenses and mirrors); the wavelength band of interest can be broader or narrower than the visible spectrum, may be wholly or partially outside the visible spectrum, and may be discontinuous; and cameras and gratings detailed herein can be adapted for use programmable-aperture applications. Other variations will be evident to those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

The invention claimed is:

1. An optical system to sense incident light, the optical system comprising:
    a photodetector array having a first array area and a second array area separate from the first array area;
    a phase-grating layer overlying the photodetector array and including:
        a grating area overlying the first array area to produce a diffractive response over the first array area; and
        a null area overlying the second array area; and
    a refractive optical element overlying the null area and the second array area to produce a refractive response over the second area.

2. The system of claim 1, wherein the refractive optical element comprises a lens.

3. The system of claim 2, further comprising a second lens aligned with the first-mentioned lens to produce the refractive response over the second area.

4. The system of claim 1, wherein the null area comprises a hole in the phase-grating layer.

5. The system of claim 2, wherein the grating area includes a phase-grating pattern and the null area includes a smooth surface opposite the photodetector array.

6. The system of claim 5, wherein the null area includes a second smooth surface opposite the photodetector array.

7. The system of claim 5, wherein the smooth surface is flat.

8. The system of claim 1, wherein the phase-grating layer includes a phase grating that defines a transverse plane opposite the photodetector array, the phase grating spaced from the array and having boundaries of odd symmetry, each boundary defined by:

a first phase-grating feature extending along the respective boundary in the transverse plane, each first phase-grating feature including a first segment adjacent the boundary and of a first width W1 in a dimension perpendicular to the boundary and within the plane, a second segment adjacent the first segment and opposite the boundary, the second segment of a second width W2 different from the first width in the dimension, and a third second segment adjacent the second segment and opposite the boundary, the third segment of a third width W3 in the dimension; and a second phase-grating feature extending along the respective boundary in the transverse plane, each second phase-grating feature including a first segment adjacent the boundary and of the first width W1 in the dimension perpendicular to the boundary and within the plane, a second segment adjacent the first segment and opposite the boundary, the second segment of the second width W2 in the dimension, and a third second segment adjacent the second segment and opposite the boundary, the third segment of the third width W3 in the dimension.

9. The system of claim 1, further comprising an aperture layer having a first aperture limiting the incident light from the phase grating to the first array area and a second aperture limiting the incident light from the refractive optical element to the second array area.

10. The system of claim 1, wherein the phase grating is one of multiple phase gratings each producing a respective diffractive response over respective areas of the photodetector array.

11. The system of claim 10, wherein the different phase gratings capture different ranges of angles of incidence for the incident light.

12. The system of claim 10, wherein the different phase gratings exhibit different and respective point spread responses to the incident light.

13. The system of claim 1, wherein the phase grating includes boundaries of odd symmetry each defined by adjacent first and second features of odd symmetry located respectively to each side of that boundary so as to induce, at a position immediately below the first and second features, for light in a wavelength band of interest incident the grating, a half-wavelength shift with respect to each other for the light passing through the adjacent first and second features, resulting in curtains of minimum intensity at the photodetector array underlying that boundary.

14. The system of claim 1, further comprising an infrared filter to block infrared components of the incident light from impinging upon only one of the first array area and the second array area.

15. A method of detecting properties of a scene using a monolithic photosensitive array, the method comprising:
receiving light in a wavelength band of interest from the scene at a diffractive optic casting a diffractive response to the light over a first area of the array;
receiving the light from the scene at a refractive optic casting a refractive response to the light over a second area of the array;
sampling the diffractive response to obtain diffractive-response data; and
sampling the refractive response to obtain refractive-response data.

16. The method of claim 15, further comprising determining whether to sample the refractive response based on the diffractive response data.

17. The method of claim 15, wherein the diffractive-response data represents an image of the scene that is unintelligible to a human observer.

18. The method of claim 17, wherein the refractive-response data represents a color image of the scene.

19. The method of claim 17, wherein sampling the diffractive response comprising acquiring successive frames of the diffractive response, the method further comprising comparing the successive frames to detective movement within the scene.

20. The method of claim 15, further comprising:
receiving the light from the scene at a second diffractive optic casting a second diffractive response to the light over a third area of the array; and
sampling the second diffractive response to obtain second diffractive-response data.

* * * * *